United States Patent [19]
Stilley

[11] Patent Number: 5,366,604
[45] Date of Patent: Nov. 22, 1994

[54] SOLAR POWERED CATHODIC CORROSION PROTECTION SYSTEM

[76] Inventor: Troy R. Stilley, 1007 Ridge St., Montrose, Colo. 81401

[21] Appl. No.: 85,319

[22] Filed: Jun. 29, 1993

[51] Int. Cl.⁵ ............................................. C23F 13/00
[52] U.S. Cl. .................................... 204/196; 204/197
[58] Field of Search ............................... 204/147, 196

[56] References Cited

U.S. PATENT DOCUMENTS

| | | | |
|---|---|---|---|
| 4,136,309 | 1/1979 | Galbertl et al. | 320/2 |
| 5,026,468 | 6/1991 | Carpenter et al. | 204/196 |
| 5,139,634 | 8/1992 | Carpenter et al. | 204/147 |

OTHER PUBLICATIONS

"Solo Photovoltaic Power Supplies for Cathodic Protection", brochure. Burge Corrosion Systems, Aztec, N. Mex.
Sun-Loc brochure. Guardian Corrosion Control Corp., Montrose, Colo.
Sun-Guard brochure. Guardian Corrosion Control Corp., Montrose, Colo.

Primary Examiner—John Niebling
Assistant Examiner—Kishor Mayekar
Attorney, Agent, or Firm—Dorr, Carson, Sloan & Peterson

[57] ABSTRACT

A cathodic protection system employs a photovoltaic panel for generating current through the metallic body to be protected from corrosion and a ground bed in response to sunlight. A battery is also charged by the photovoltaic panel during daytime, and then supplies current at a reduced level through the metallic body and ground bed during nighttime. A solid state voltage regulator limits the maximum charging voltage across the battery to a predetermined value required to fully charge the battery. A second photovoltaic panel can be included for additional current capacity. In an alternative embodiment, the voltage regulator monitors the battery voltage and triggers a solid state relay to shunt excess current from the photovoltaic panel when the battery voltage exceeds a predetermined limit.

10 Claims, 5 Drawing Sheets

SOLAR POWERED CATHODIC CORROSION PROTECTION SYSTEM

BACKGROUND OF THE INVENTION

1. Field of the Invention

The present invention relates generally to the field of cathodic corrosion protection systems. More specifically, the present invention discloses a variable current solar powered cathodic corrosion protection system in which a battery and a solid state voltage regulator are used to provide a minimum current that is a predetermined fraction of the nominal constant current generated by an equivalent conventional power supply.

2. Statement of the Problem

Cathodic protection systems have been widely used for many years to prevent corrosion in pipelines, well casings, and other metallic bodies that are buried in an electrolyte. In a conventional cathodic protection system, the metallic body to be protected is connected to the negative terminal (or cathode) of a current source. The positive terminal of the current source is connected to a conductive ground bed (or anode). The current source induces a current from the metallic body (−) to the ground bed (+) through the ground. The resulting negative polarization of the metallic body tends to minimize corrosion. The traditional approach has been to maintain a relatively constant current over time. In cases where an AC power supply is readily available, this is accomplished simply by means of a transformer and rectifier to produce a constant DC current of the desired amplitude.

However, even in cases where an AC power supply is not available, the conventional approach has largely been to substitute a power supply (e.g., photovoltaic panels and batteries) that are designed to produce a relatively constant current over each 24 hour period. This simplistic approach is wasteful in that it requires unnecessarily large photovoltaic panels and excessive battery capacity. Instead, studies have shown that once the metallic body has been initially polarized, a minimal current is usually sufficient to maintain polarization for an extended period of time thereafter. Thus, it is possible to design a variable current cathodic protection system having a peak photovoltaic capacity sufficient to polarize the metallic body, but with a backup system (e.g., batteries) for nighttime operation that provides a fraction of the nominal constant current provided by a conventional power supply. For example, assuming the nighttime (or low cycle) current is reduced to 30% of the nominal current, the required capacity of the solar panels can be reduced by approximately 45% and the required battery capacity can be reduced by approximately 90%.

A number of photovoltaic cathodic protection systems have been invented in the past that provide reduced current during nighttime, including the following:

| Inventor | Patent No. | Issue Date |
| --- | --- | --- |
| Carpenter, et al. | 5,026,468 | June 25, 1991 |
| Carpenter, et al. | 5,139,634 | Aug. 18, 1992 |

"Solo Photovoltaic Power Supplies for Cathodic Protection" brochure by Burge Corrosion Systems, Aztec, N. Mex.

SUN-LOC brochure by Guardian Corrosion Control Corp., Montrose, Colo.

SUN-GUARD brochure by Guardian Corrosion Control Corp., Montrose, Colo.

The patents of Carpenter, et al. disclose a dual ground bed cathodic protection system that uses a solar power supply to generate current during daytime and a sacrificial anode to generate current at night. The system includes automatic controls to switch between the solar power supply and the sacrificial anode.

The brochure by Burge Corrosion Systems discusses a cathodic protection system powered by photovoltaic panels with a nickel-cadmium battery backup. For example, a nominal 6-volt/6-amp photovoltaic array is allowed to reach 8-volt/8-amp output levels at peak insolation during the day. After dark, the Ni-Cad batteries provide a minimum of 4-volt/4-amp with no sun. The brochure notes that studies have shown that adequate polarization on well casings can be retained for protection over long periods of time with as little as 10% of the current required for initial polarization.

The SUN-LOC brochure by Guardian Corrosion Control Corp. discusses several cathodic protection systems that are powered by photovoltaic panels. The simplest version shown in FIG. 3 of this brochure has no battery backup. The traditional approach shown in FIG. 1 of the brochure uses lead-acid batteries to provide essentially constant current. The embodiment shown in FIG. 2 of the brochure uses lead-acid batteries to provide approximately 50% of nominal current at night. Lead-acid batteries require a fairly sophisticated voltage regulation system to prevent both overcharging and excessive discharging that can damage lead-acid batteries.

The SUN-GUARD brochure discusses the corresponding newer models of the cathodic protection systems produced by Guardian Corrosion Control Corp. using nickel-cadmium batteries in place of lead-acid batteries. The versions of these systems that were sold more than one year prior to the filing date of this application used zener diodes (and other discrete components) to control the voltage across the battery, and did not use a solid state voltage regulator.

3. Solution to the Problem

None of the prior art references uncovered in the search show a variable current photovoltaic cathodic protection system that uses a battery and a solid state voltage regulator to provide a minimum current that is a predetermined fraction of the nominal current generated by conventional power supply.

SUMMARY OF THE INVENTION

This invention provides a cathodic protection system having a photovoltaic panel for generating current through the metallic body to be protected from corrosion and a ground bed in response to sunlight. A battery is also charged by the photovoltaic panel during daytime, and then supplies current at a reduced level through the metallic body and ground bed during nighttime. A solid state voltage regulator limits the maximum charging voltage across the battery to a predetermined value required to fully charge the battery. A second photovoltaic panel can be included for additional current capacity. In an alternative embodiment, the voltage regulator monitors the battery voltage and triggers a solid state relay to shunt excess current from the photovoltaic panel when the battery voltage exceeds a predetermined limit.

A primary object of the present invention is to provide a variable current solar powered cathodic protection system that can be produced at lower cost due to reductions in the required capacities in the photovoltaic panels and batteries and more efficient regulator circuitry.

Another object of the present invention is to provide a solar powered cathodic protection system having enhanced reliability due to a minimal number of components that might be subject to failure.

Yet another object of the present invention is to provide a solar powered cathodic protection system that can economically substitute more expensive nickel-cadmium batteries in place of lead-acid batteries.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
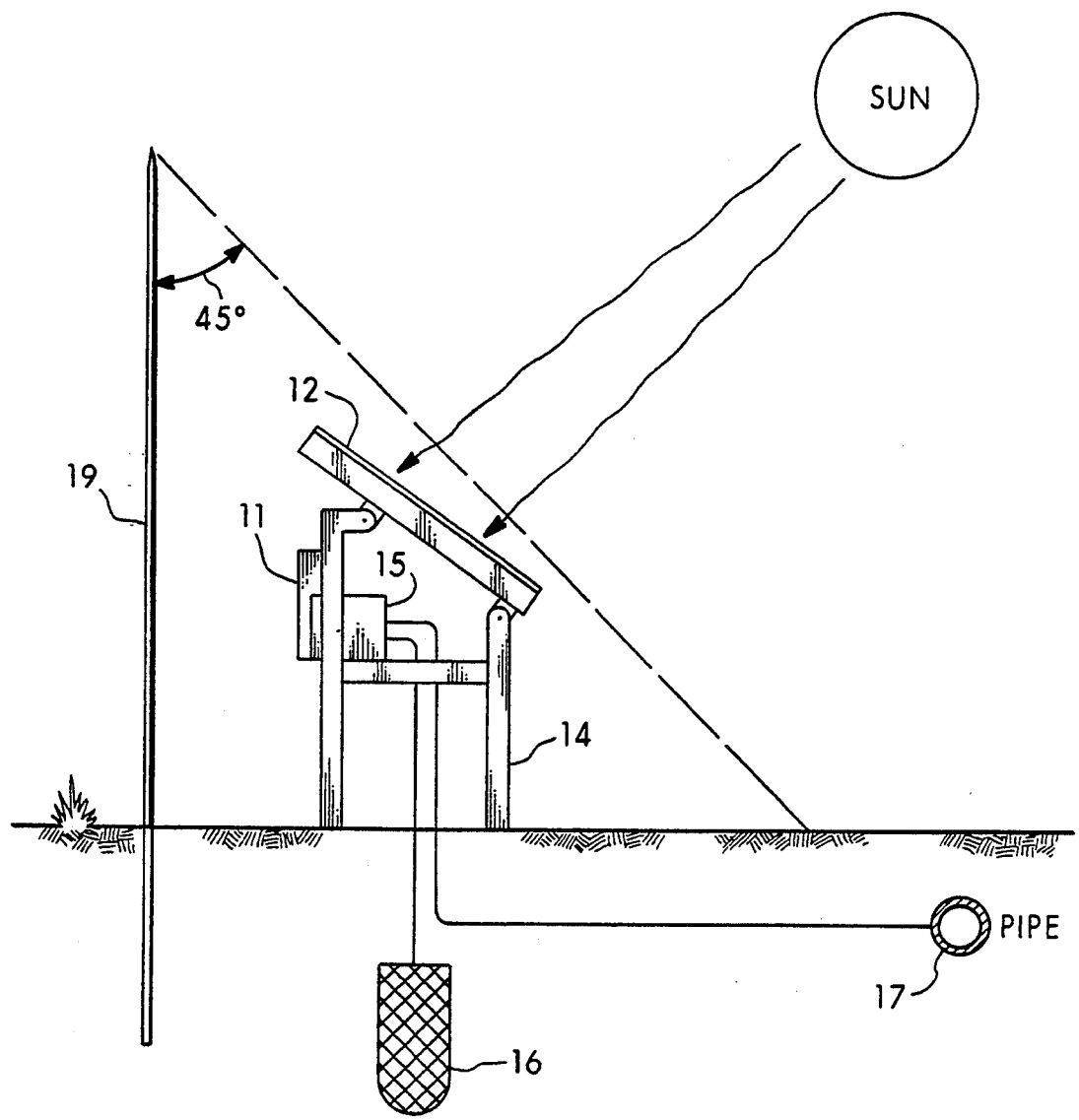
FIG. 1 is a simplified side view of the present invention.
Figure 3:
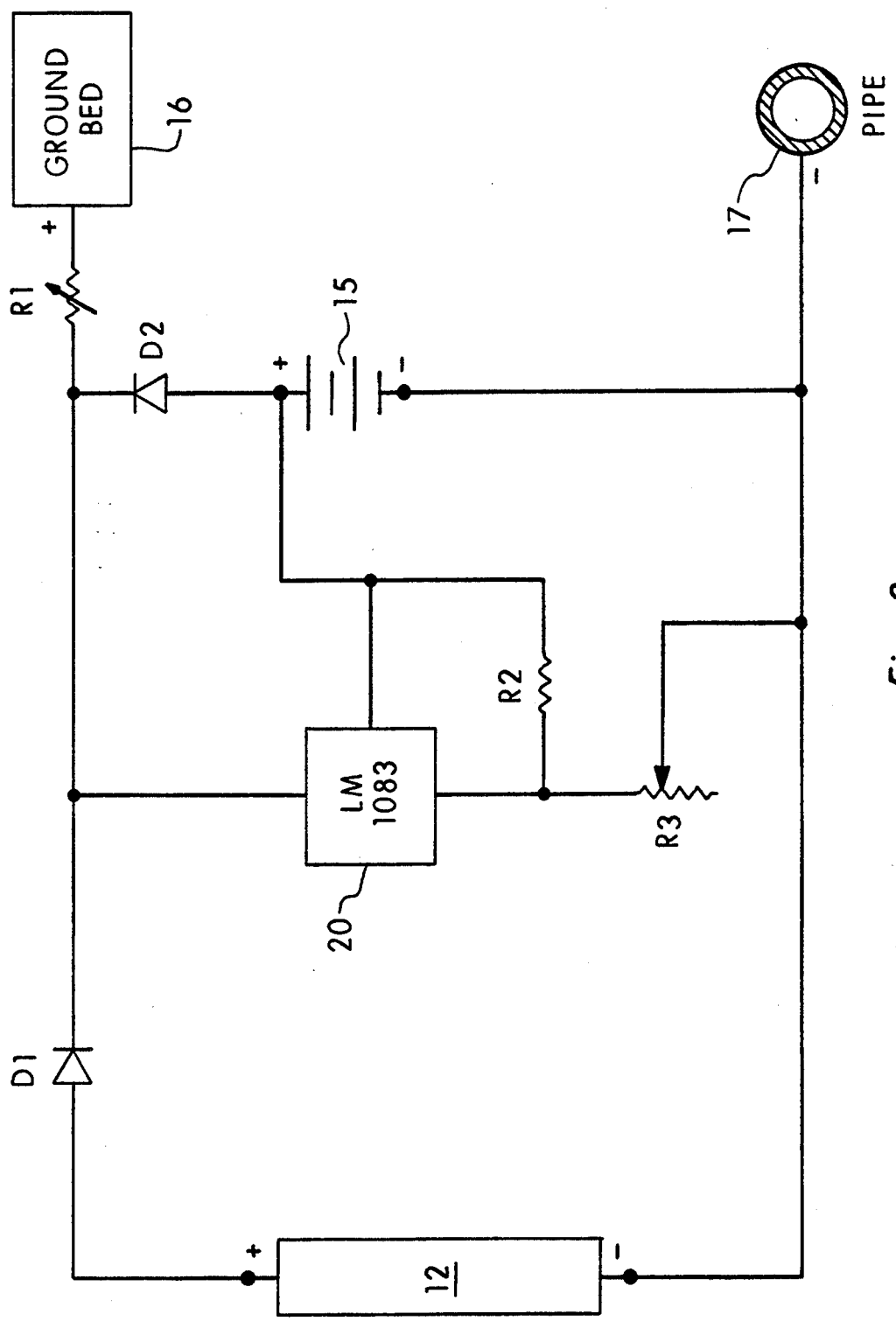
FIG. 3 is a schematic diagram of a first embodiment of the present invention intended for use in low capacity installations.

Turning to FIG. 3, a schematic diagram of the simplest embodiment of the present invention is provided. FIG. 1 shows a simplified side view of a typical installation. The major components are a number of photovoltaic panels 12 that generate DC current in response to sunlight; a number of batteries 15 for storing a portion of the electrical energy produced by the photovoltaic panels; a metallic body 17 (such as a pipeline or well casing) to be protected from corrosion; a ground bed 16 to serve as the anode for the system; and a control unit 11 shown in FIG. 1 containing the remaining circuitry for regulating battery charging and the current supplied through the metallic body and ground bed. FIG. 1 also shows that the photovoltaic panels 12 are supported in the optimum orientation for solar exposure by a support structure 14. The batteries 15 and control unit 11 are typically sheltered under the photovoltaic panels 12 as shown. A lightning rod 19 extends upward from the ground adjacent to the assembly to protect against lightning strikes.

Figure 2:
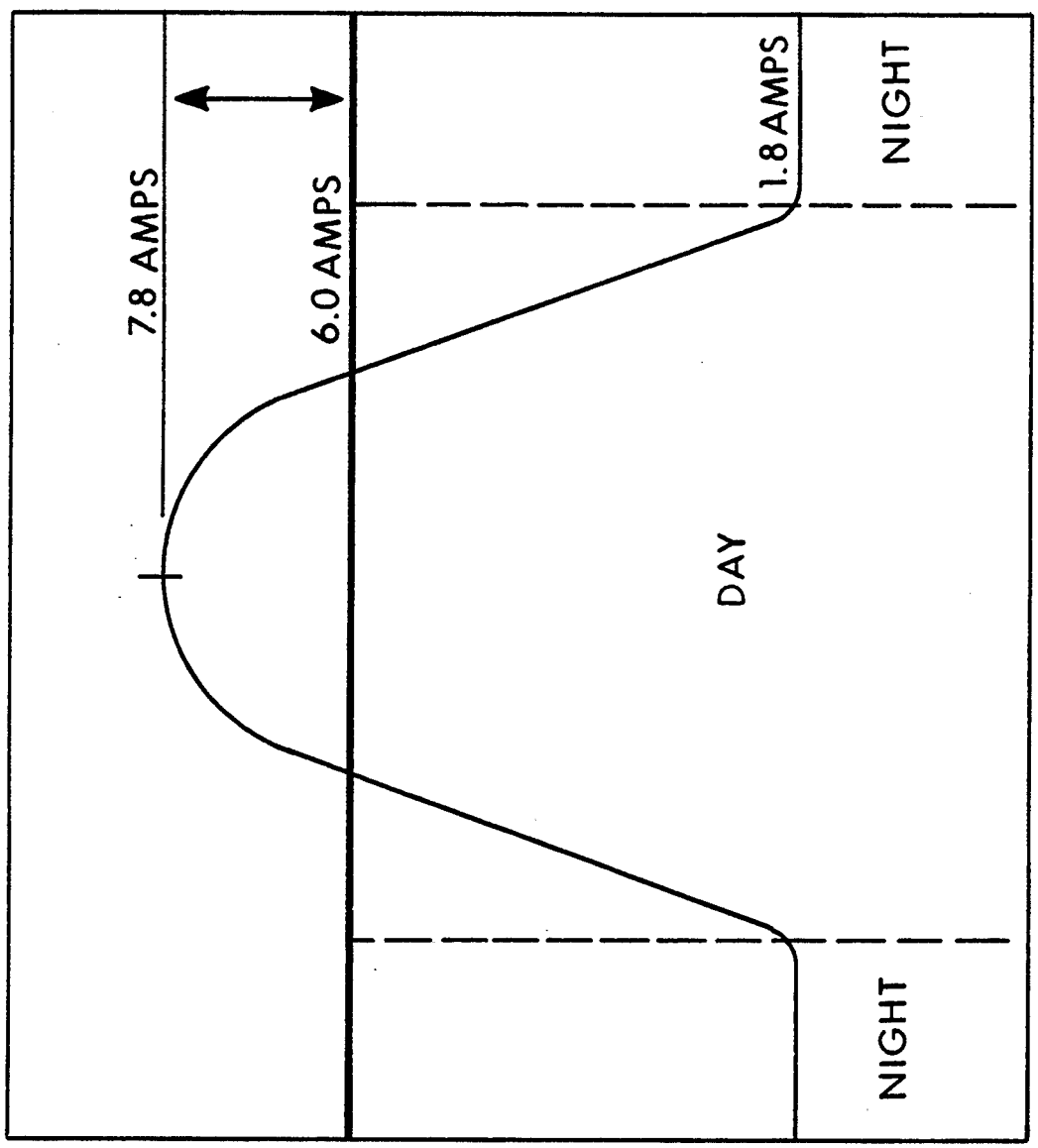
FIG. 2 is a graph showing an example of the variation in the current supplied by the photovoltaic panels and battery in the present invention to the metallic body being protected over a typical day.

FIG. 2 is a graph showing the current induced by the present invention through the metallic body 17 over the course of a day. The graph assumes that the photovoltaic panels 12 are designed to provide a nominal current of 6.0 amps, which is typical for many installations. During peak daytime conditions, the actual current supplied by the photovoltaic panels 12 can reach approximately 130% of nominal current, or 7.8 amps. During nighttime, the batteries 15 provide at least 30% of nominal current, or 1.8 amps.

FIG. 3 is a schematic diagram of an embodiment of the present invention intended for use in installations where low current capacity is sufficient. As before, the photovoltaic panel 12 generates current in response to incident sunlight. The metallic body 17 to be protected is connected to the negative terminal of the photovoltaic panel 12 and the ground bed (or anode) 16 is connected to the positive terminal. The batteries 15 are connected in parallel with the photovoltaic panel 12 so that the batteries 15 are charged by a portion of the current generated by the panel 12.

The key feature of the present invention is the solid state voltage regulator 20 connected with the batteries 15 and the photovoltaic panel 12 to regulate the charging voltage placed across the batteries 15. The voltage regulator 20 is an LM1083 regulator available from National Semiconductor and other commercial suppliers. During daytime, the voltage regulator 20 takes the unregulated voltage produced by the photovoltaic panel 12 across the series combination of the voltage regulator 20 and variable resistor R3, and outputs a constant voltage across resistor R2 (e.g., 12 volts) as long as the input voltage across the voltage regulator 20 remains at least approximately 2.5 volts higher. Resistors R2 and R3 form a voltage divider that controls the charging voltage across the batteries 15.

The desired charging voltage across the batteries can be manually adjusted by means of the variable resistor R3. The charging voltage is usually determined by the voltage necessary to induce a low duty current through the metallic body equal to approximately 30% of the desired nominal current for the installation. In other words, since the electrical resistance of the path through the ground bed 16 and the metallic body 17 does not change significantly, the batteries 15 should be charged to a voltage of approximately 30% of the nominal voltage. It should be expressly understood that other percentages can be used. Any value less than 100% of the nominal daytime current will result in a degree of savings. The lower limit is effectively set by the amount of current necessary to continuously maintain polarization of the metallic body 17. In the preferred embodiment, a percentage between approximately 10% and 50% is preferred.

To summarize, a portion of the current from the photovoltaic panel 12 is routed through the voltage regulator 20 to charge the batteries 15 and a portion of the current flows through the metallic body 17 and the ground bed 16 for corrosion protection. After the batteries 15 have been fully charged, the voltage regulator ensures that the battery charging voltage does not exceed a safe level. Any excess current is shunted back to the photovoltaic panels.

A solid state voltage regulator offers a number of advantages over the prior art. The primary advantage lies in the fact that the battery charging circuitry has been greatly simplified and the number of discrete electrical components has been drastically reduced. This reduces manufacturing costs, and more importantly, dramatically increases the reliability of the unit in the field. Secondly, a solid state voltage regulator provides more stable voltage regulation and greater current handling capabilities than many conventional discrete circuits.

At nighttime, the photovoltaic panel 12 and the voltage regulator 20 are essentially dormant. The output resistance of the voltage regulator (combined with resistors R2 and R3) is sufficiently large so that the batteries 15 discharge through the metallic body 17 and the ground bed 16. Diode D1 is included to prevent the batteries 15 from discharging through the photovoltaic panel 12 during nighttime.

Resistors R2 and R3 also provide surge protection for the voltage regulator 20 in the event of lightning. Diode D2 also provides surge protection in the event of lightning. Resistor R1 adjustably limits current through the metallic body 17 and the ground bed 16 relative to the desired nominal current for the particular installation.

Figure 4:
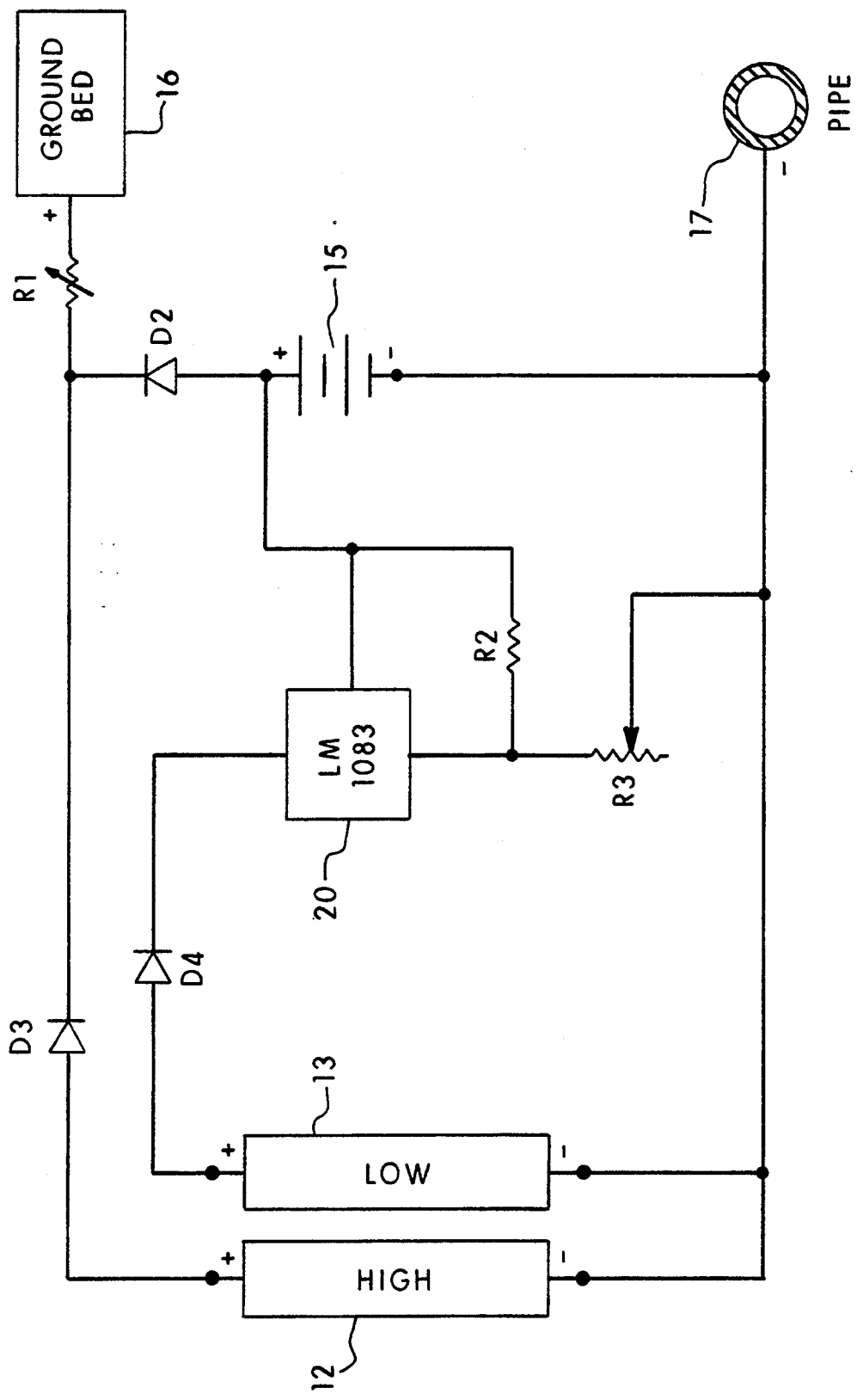
FIG. 4 is a schematic diagram of a second embodiment of the present invention intended for use in medium capacity installations.

FIG. 4 is a schematic diagram of a second embodiment of the present invention intended for use with installations requiring a medium current capacity. Two photovoltaic panels 12 and 13 are used to generate current. The first panel ("HIGH") 12 is dedicated solely to generating current through the metallic body 17 and the ground bed 16 for corrosion protection. This first panel 12 is sized to provide approximately 130% of nominal current requirements for daytime operation. The second panel ("LOW") 13 is employed primarily for charging the batteries 15 using a voltage regulator circuit that is functionally the same as was previously described in FIG. 3. Nighttime operation is also essentially the same as was previously described. Blocking diodes D3 and D4 prevent the batteries 15 from discharging through the photovoltaic panels 12 and 13 when they are dormant.

Figure 5:
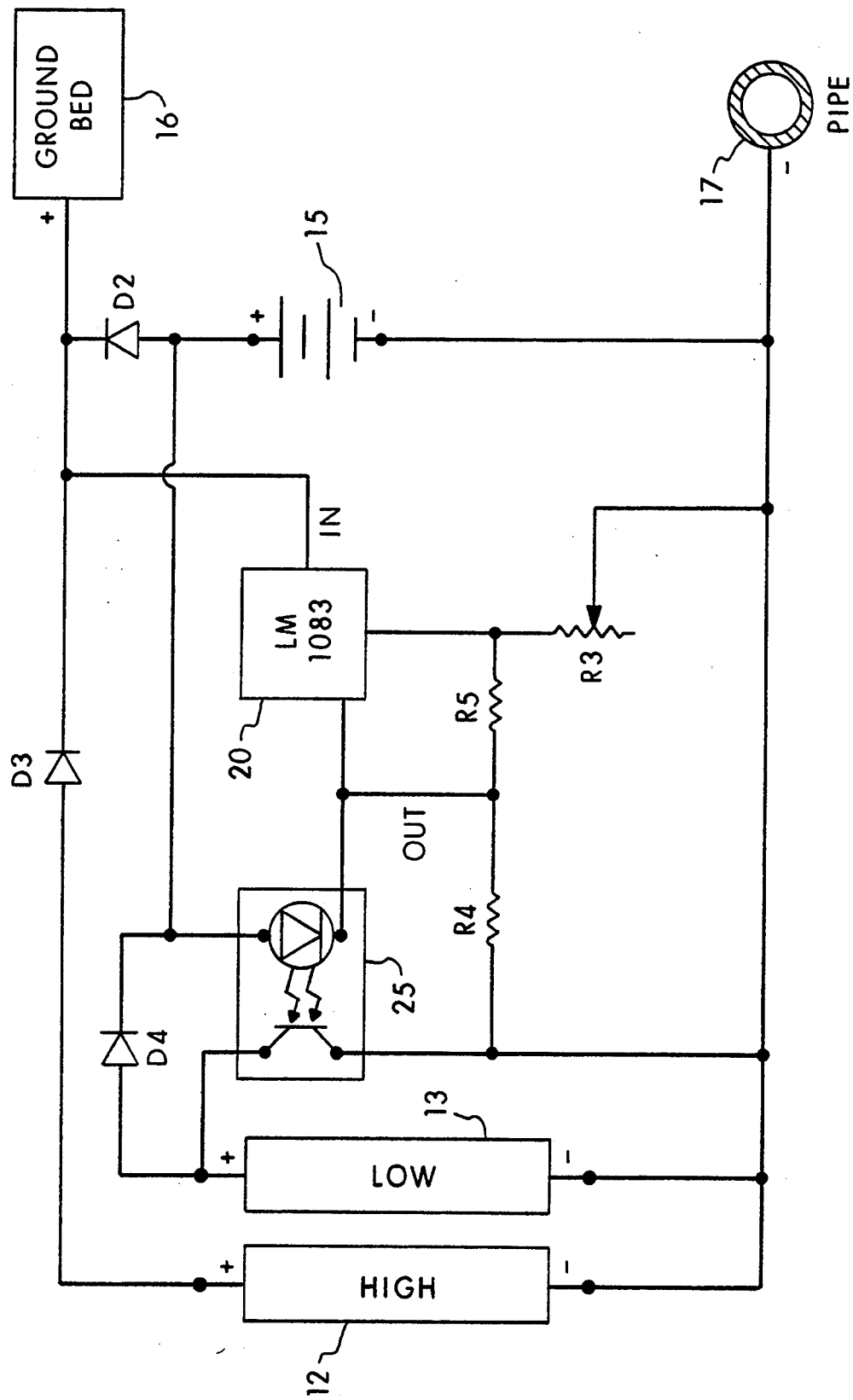
FIG. 5 is a schematic diagram of a third embodiment of the present invention intended for use in high capacity installations.

FIG. 5 is a schematic diagram of a third embodiment of the present invention intended for use in installations requiring high current capacity. Here again, two photovoltaic panels 12 and 13 are used. The first photovoltaic panel ("HIGH") 12 is dedicated solely to generating current to polarize the metallic body 17 during daytime operation. The second photovoltaic panel ("LOW") 13 charges the batteries 15 using a shunt-type regulator scheme. A solid state relay ("SSR") 25 shunts the current from the second photovoltaic panel 13 after the batteries 15 have been charged to a predetermined voltage. An SSR 25 is employed in high current implementations due to the current handling limitations associated with a solid state voltage regulator.

The SSR 25 has a "pick" voltage of approximately 4.2 VDC and a "release" voltage of approximately 2.5 VDC. When the voltage across the LED portion of the SSR exceeds 4.2 volts, the SSR shorts out the second photovoltaic panel 13 to terminate charging of the batteries 15. Similarly, the SSR opens when the voltage across the LED drops below 2.5 volts to resume charging the batteries 15. A solid state voltage regulator 20 (LM1083) is used in conjunction with a voltage divider network of two resistors R4 and R5 (and variable resistor R3) to provide a reference offset voltage for the SSR 25. This offset voltage can be adjusted using the variable resistor R3 to provide different charging voltage limits for the batteries 15. For example, if the batteries 15 are fully charged when their terminal voltage reaches 14 volts, then the offset voltage should be set for 9.8 volts. As soon as the terminal voltage reaches 14 volts, the SSR 25 closes causing the second photovoltaic panel 13 to be shorted out.

The batteries are prevented from being discharged through the SSR 25 by a blocking diode D4. Another blocking diode D2 removes the first photovoltaic panel 12 from the battery charging circuit during daytime operation. A third blocking diode D3 prevents the batteries 15 from discharging through the first photovoltaic panel 12 during nighttime operation.

The above disclosure sets forth a number of embodiments of the present invention. Other arrangements or embodiments, not precisely set forth, could be practiced under the teachings of the present invention and as set forth in the following claims.

I claim:

1. A cathodic corrosion protection system comprising:

a metallic body to be protected from corrosion;

a ground bed;

a photovoltaic panel for generating current through said metallic body and said ground bed in response to sunlight, said photovoltaic panel having a capacity under nominal daytime conditions to generate sufficient current ("nominal current") to polarize said metallic body;

a battery charged by a voltage placed across said battery by said photovoltaic panel during daytime, for supplying current through said metallic body and said ground bed at a reduced level during nighttime; and a solid state voltage regulator means for regulating said charging voltage across said battery so as not to exceed a selected maximum value so that said battery current during nighttime is approximately 30% or less of said nominal current, and for shunting excess current back to said photovoltaic panel.

2. The cathodic corrosion protection system of claim 1 wherein said battery is a nickel-cadmium battery.

3. The cathodic corrosion protection system of claim 1, further comprising a solid state relay controlled by said voltage regulator to shunt excess current supplied by said photovoltaic panel.

4. The cathodic corrosion protection system of claim 1, further comprising a second photovoltaic panel for generating additional current through said metallic body and said ground bed in response to sunlight.

5. A cathodic corrosion protection system comprising:

a first photovoltaic panel for generating current in response to sunlight, said first photovoltaic panel having a positive terminal and a negative terminal;

a second photovoltaic panel for generating current in response to sunlight, said second photovoltaic panel having a positive terminal and a negative terminal;

a metallic body to be protected from corrosion connected to said negative terminal of said first photovoltaic cell, said first photovoltaic panel having a capacity under nominal daytime conditions to generate sufficient current ("nominal current") to polarize said metallic body;

a ground bed connected to said positive terminal of said first photovoltaic cell;

a battery charged by a voltage placed across said battery by said second photovoltaic panel during daytime, for supplying current through said metallic body and said ground bed at a reduced level during nighttime; and a solid state voltage regulator means for regulating said charging voltage across said battery so as not to exceed a selected maximum value so that said battery current during nighttime is approximately 30% or less of said nominal current, and for shunting excess current back to said second photovoltaic panel.

6. The cathodic corrosion protection system of claim 5, wherein said battery is a nickel-cadmium battery.

7. The cathodic corrosion protection system of claim 5, further comprising a solid state relay controlled by said voltage regulator to shunt excess current supplied by said second photovoltaic panel.

8. A cathodic corrosion protection system comprising:

a metallic body to be protected from corrosion;

a ground bed;

a photovoltaic panel for generating current through said metallic body and said ground bed in response to sunlight, said photovoltaic panel having a capacity under nominal daytime conditions to generate sufficient current ("nominal current") to polarize said metallic body;

a battery charged by a voltage placed across said battery by said photovoltaic panel during daytime, for supplying current through said metallic body and said ground bed at a reduced level during nighttime;

a solid state voltage regulator for sensing said voltage of said battery; and a solid state relay means controlled by said voltage regulator for shunting current from said photovoltaic panel when said battery voltage exceeds a selected value so that said battery current during nighttime is approximately 30% or less of said nominal current, and for shunting excess current back to said photovoltaic panel.

9. The cathodic corrosion protection system of claim 8 wherein said battery is a nickel-cadmium battery.

10. The cathodic corrosion protection system of claim 8, further comprising a second photovoltaic panel for generating additional current through said metallic body and said ground bed in response to sunlight.

* * * * *